United States Patent [19]

Masud et al.

[11] Patent Number: 4,878,290
[45] Date of Patent: Nov. 7, 1989

[54] METHOD FOR MAKING THIN FILM MAGNETIC HEAD

[75] Inventors: Charles R. Masud; Cheng-Teh Wu, both of San Jose, Calif.

[73] Assignee: International Business Machines Corporation, Armonk, N.Y.

[21] Appl. No.: 310,414

[22] Filed: Feb. 13, 1989

[51] Int. Cl.⁴ .............................. G11B 5/42
[52] U.S. Cl. .................... 29/603; 156/643; 427/131; 427/132
[58] Field of Search ............... 29/603; 360/122, 125; 427/131, 132; 156/643

[56] References Cited

U.S. PATENT DOCUMENTS

| | | | |
|---|---|---|---|
| 4,550,353 | 10/1985 | Hirai et al. | 29/603 X |
| 4,727,643 | 3/1988 | Schewe et al. | 29/603 |
| 4,791,719 | 12/1988 | Kobuyashi et al. | 29/603 |

Primary Examiner—Carl E. Hall
Attorney, Agent, or Firm—Otto Schmid, Jr.

[57] ABSTRACT

A method for making a thin film magnetic head in which the pole tips are trimmed to a predetermined width prior to the completion of the magnetic yoke structure. The thin film magnetic head is produced through deposition of the first magnetic layer in two stages, through deposition of the coil, the insulating material for the coil and through deposition of the second magnetic layer. The thin film head is then masked by a photoresist mask having openings to expose specific parts of the pole tip region, and an ion milling operation is used to etch the head assembly to form pole tips having a predetermined width. The shaping layer for the second magnetic layer is then deposited to complete the magnetic yoke structure.

9 Claims, 2 Drawing Sheets

METHOD FOR MAKING THIN FILM MAGNETIC HEAD

BACKGROUND OF THE INVENTION

This invention relates to magnetic heads, and more particularly to a method for making thin film magnetic heads.

DESCRIPTION OF THE PRIOR ART

In magnetic recording technology it is constantly desired to improved the areal density at which information can be recorded and reliably read. This desire has lead to a trend toward greater bit density along a magnetic recording track and a shrinking track width.

One of the important parameters which determines the performance of a magnetic head is the width of the pole tips. As the track width decreases, it becomes progressively more difficult to produce the pole tips to the precision required.

It has been suggested in the prior art to obtain the desired pole tip width by fabricating the pole tips wider than desired and subsequently trimming the pole tips to the desired width. For example, the article by Gardner et al, IBM Technical Disclosure Bulletin, Vol. 24, No. 3, August, 1981, P 1470, describes a process which uses a titanium mask, and etching by ion beam milling or reactive ion etching to achieve the desired track width.

U.S. Pat. Nos. 4,016,601 and 4,078,300 to Lazzari describe methods for trimming the pole tips in a thin film magnetic head by the use of an ionic erosion process by the use of a photoresist mask. However, as the thin film magnetic heads have gotten smaller, it has become progressively more difficult to trim the pole tips to the required precision by the use of a photoresist mask.

The prior art does not show a process for making a thin film magnetic head in which the pole tip width is trimmed prior to completion of the magnetic yoke structure.

SUMMARY OF THE INVENTION

It is therefore the principal object of this invention to provide a process for making a thin film magnetic head in which the pole tips are trimmed to a predetermined width prior to completion of the magnetic yoke structure.

In accordance with the present invention, the method for making a thin film magnetic head of the type which comprises two layers of magnetic material forming a yoke structure which has a transducing gap at one end and a back gap region at the other end and a conductor coil for actuating the magnetic yoke deposited between the transducting gap and the back gap of the yoke structure. The improved method comprises the steps of, after the steps of forming the first layer of magnetic material, the conductor coil and insulating material to insulate the conductor coil from each of the layers of magnetic meterial, deposition a second layer of magnetic material having a reduced width near the pole tip region and which forms a transducing gap at the pole tip region and is in contact with the first layer of magnetic material in the back gap region, depositing a masking layer over the second layer of magnetic material which is shaped to expose a predetermined area of the second layer of magnetic material near the pole tip region, etching the thin film magnetic head to selectively remove material in the exposed area to form pole tips having a predetermined width, removing the masking layer, and depositing a third layer of magnetic material over substantially all of the second layer of magnetic material except the pole tips to form a magnetic pole piece having a thinner and narrower cross section in the pole tip region and a thicker and wider cross section between the pole tip region and the back gap region.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
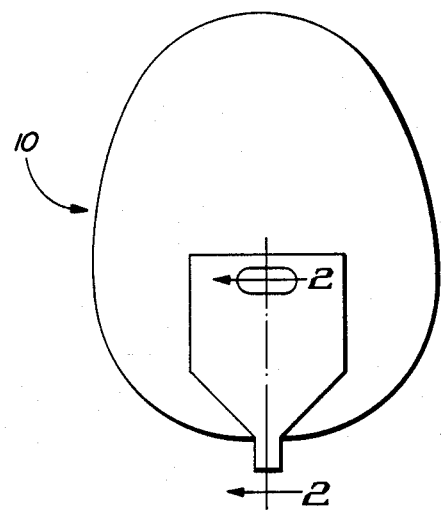
FIG. 1 is a top view of a thin film magnetic head according to the present invention.
Figure 2:
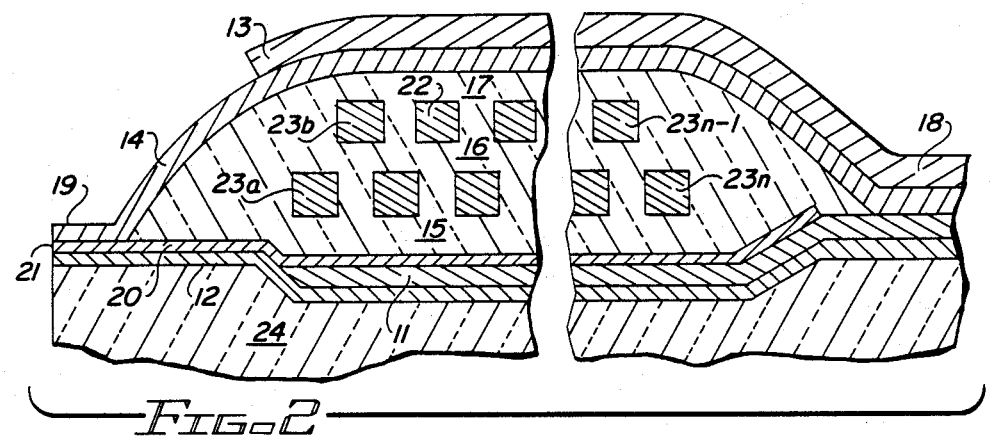
FIG. 2 is a section view taken along lines 2—2 of FIG. 1.

As shown in FIGS. 1 and 2 of the drawings, the thin film magnetic head 10 comprises a yoke structure formed of two layers 12 and 14 of a magnetic material such as Permalloy, for example. Layers 12 and 14 preferably are deposited in two stages which include shaping layers 11 and 13, respectively. These layers 12 and 14 are separated by insulating layers 15, 16 and 17 except at the back gap region 18, where they make physical contact, and at the pole tip region 19, where they are separated by a thin layer 20 of non-magnetic material to form a transducing gap 21. A flat conductor coil 22 is included in the space between magnetic layers 12 and 14. Coil 22 has a plurality of turns 23 a —n in two layers plated in an elliptical pattern between layers 15, 16, and 17 of insulating material. The end of transducing gap 21 coincides with an air bearing surface (ABS) formed on a non-magnetic substrate 24 on which the above-described layers are deposited. Transducer gap 21 interacts in air bearing relation with a magnetic recording medium (not shown), such as a rotatable magnetic disk. When the disk rotates, the head flies with the ABS closely adjacent to the disk recording surface.

According to a feature of this invention, the yoke structure is fabricated in a different manner from that used in the prior art.

The thin film magnetic head is fabricated by depositing magnetic layer 12 and shaping layer 11 on substrate 24 by the use of appropriate masks, to provide a deposit of reduced thickness in the pole tip region 19. Then the non-magnetic layer 20 is deposited on layers 11 and 12 except at the back gap region 18. The first insulating layer 15 is then deposited over layer 20 except at the transducer gap 21. Elliptically spiraling turns 23 of the first layer of continuous flat conductors are deposited by electroplating, for example, on insulating layer 15. Insulating layer 16 is deposited over the first layer of the coil, the turns of the second layer of the coil are deposited, and insulating layer 17 is deposited over the coil. Magnetic layer 14 is then deposited over the now-insulated coil except, as previously noted, at back gap region 18 where it makes physical contact with magnetic layer 12.

According to an important feature of the invention, pole tip 19 should have a preselected substantially constant width W (FIG. 5), which is equal to or slightly less than the width of the track on the associated rotatable magnetic medium. According to the present invention, the selected width W of the pole tips is accomplished by pole tip trimming, and the pole tip trimming step takes place prior to the deposition of the shaping layer 13 for the second magnetic layer 14 as will be described in detail below. This change in the process enables the pole tips to be trimmed with a much greater precision than was possible with the prior art process.

Figure 3:
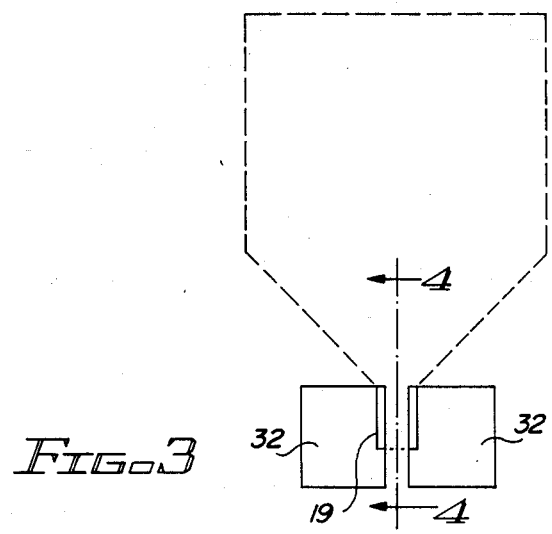
FIG. 3 is a top view of the yoke structure for a thin film magnetic head when masked for pole tip trimming in accordance with the present invention.
Figure 4:
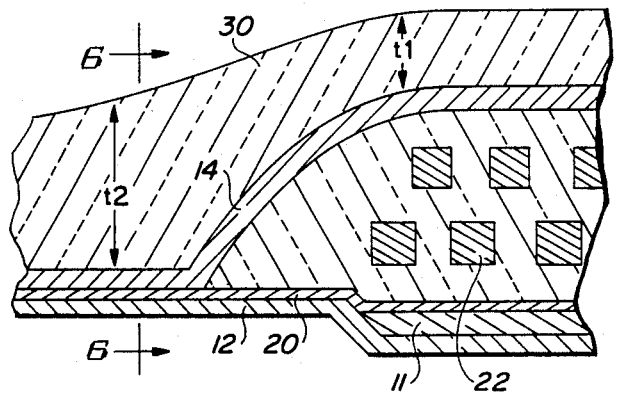
FIG. 4 is a section view taken along lines 4—4 of FIG. 3.
Figure 5:
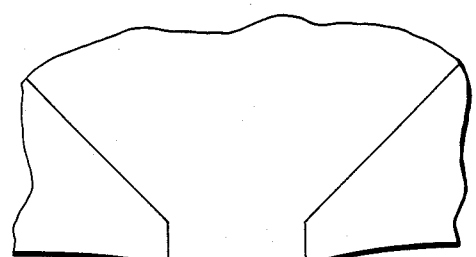
FIG. 5 is an enlarged view of the pole tips of the thin film magnetic head after the pole tip trimming operation.
Figure 6:
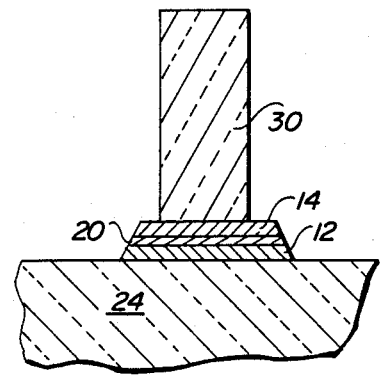
FIG. 6 is a section view taken along lines 6—6 of FIG. 5.

As shown in FIGS. 3, 4 and 6 the thin film head assembly is covered with a photoresist mask 30 after the deposition of magnetic layer 14 but before the deposition of the shaping layer 13. Windows 32 are then formed in the photoresist mask on either side of the pole tip region 19 of the head. The masked head is then subjected to an ion milling process in which the unmasked part of the head is etched to trim the pole tips to the desired width W as shown in FIG. 5.

The ion milling process is carried out at substantially normal incidence to the surface to be milled, and this causes the unmasked head structure to be etched along with the photoresist mask. This also causes redeposition of the material etched from the head both on the remainder of the mask and also the previously etched head structure. For this reason, the ion milling process is executed in two steps. In the first step the unmasked head structure is etched through magnetic layer 14, the non-magnetic gap layer 20, and magnetic layer 12 down to substrate 24 as shown in FIG. 5. To insure complete removal of this material, the first step is preferably carried out until a slight over-etching, into substrate 24, occurs. The second step in the ion milling process is provided to remove all of the re-deposition mateiral and this step is carried out at a large angle such as 75 to 80 degrees to the normal, for example. In a specific embodiment of the ion milling step, a power density of about 2 watts per square centimeter was used, and this power density resulted in an etching rate for permalloy magnetic material of about 550 angstroms per minute. Of the total ion milling time, about one-third of the time was taken up by the clean-up of the redeposition material. The photoresist mask is then removed and the magnetic shaping layer 13 is then deposited to complete the thin film magnetic head.

The photoresist mask is also etched during the ion milling process. The thickness t1 (FIG. 4) of the resist on top of the head, due to the contour of the magnetic layer 14, is less than the photoresist thickness t2 over the pole tip area. It can be seen that the photoresist thickness t2 in the present invention can be significantly reduced when compared to the prior art process since an additional thickness greater than twice the thickness of the shaping layer 13 would be required in the prior art process. The thickness t2 of the photoresist layer is also reduced by delaying etching away of the magnetic material deposited at the same time as magnetic layer 14 in the area outside pole tip region 19 until after the ion milling step has been completed. The thinner photoresist mask over the pole tip region results in greatly improved track width control. In addition, there is a greatly reduced chance of damage to the magnetic yoke due to the reduced step coverage problem. A further advantage is that the shaping layer 13 can be placed at the optimum point relative to the zero throat position without regard to possible magnetic yoke damage during the pole tip trimming step.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. The method for making a thin film magnetic head, said thin film magnetic head being of the type comprising two layers of magnetic material forming a yoke structure, said yoke structure at one end comprising a pole tip region in which said layers of magnetic material are separated by a predetermined distance to produce a transducing gap and at another end comprising a back gap region, said yoke structure being activated by a conductor coil deposited between said one end and said another end of said yoke structure, the improvement comprising the steps of:

after the steps of forming said first layer of magnetic material, said conductor coil and electrically insulating material to insulate said conductor coil from each of said layers of magnetic material;

depositing a second layer of magnetic material which contacts said first layer of magnetic material in said back gap region and is separated from said first layer of magnetic material by a predetermined distance in said pole tip region to form a transducing gap, said second layer of magnetic material having a reduced width near said pole tip region;

depositing a masking layer over said second layer of magnetic material, said masking layer being shaped to expose a predetermined area of said second layer of magnetic material at said pole tip region;

etching said thin film magnetic head to selectively remove material in said exposed area thereby to form pole tips having a predetermined width;

removing said masking layer; and depositing a third layer of magnetic material over substantially all of said second layer of magnetic material except said pole tip region to form a magnetic pole piece having a thinner and narrower cross-section in the pole tip region and a thicker and wider cross-section between the pole tip region and the back gap region.

2. The method of claim 1 wherein said masking layer comprises a photoresist material.

3. The method of claim 2 wherein said masking layer comprises an opening on each side of said reduced width section of said second layer of magnetic material, said openings being separated by a predetermined width.

4. The method of claim 1 wherein said etching steps is carried out by an ion etching process.

5. The method of claim 4 wherein said etching process is an ion milling process.

6. The method of claim 1 wherein said layers of magnetic material are made of a high permeability material.

7. The method of claim 6 wherein said material of said layers of magnetic material is NiFe.

8. The method of claim 7 wherein said layers of magnetic material are deposited by electroplating.

9. The method of claim 1 wherein said first layer of magnetic material is formed in two layers.

* * * * *